United States Patent Office 3,476,706
Patented Nov. 4, 1969

3,476,706
CURING RESORCINOL-ALDEHYDE RESOL RESINS EMPLOYING ANILINE OR ANILINE SALTS
Leopold F. Bornstein, Wilmington, Mass., assignor to Georgia-Pacific Corporation, Portland, Oreg., a corporation of Georgia
No Drawing. Continuation-in-part of application Ser. No. 275,228, Apr. 24, 1963. This application Apr. 22, 1968, Ser. No. 723,299
Int. Cl. C08g 5/10, 51/74
U.S. Cl. 260—54                                9 Claims

ABSTRACT OF THE DISCLOSURE

The curing rate of resorcinol-aldehyde resol resins may be increased and/or the curing temperature of such resins may be decreased by effecting the cure of such novolaks with a suitable aldehyde cross-linking material in the presence of aniline and/or aniline salts such as aniline hydrochloride and/or the various homologues and analogues thereof.

---

This application is a continuation-in-part of Application Ser. No. 275,228, now abandoned, filed Apr. 24, 1963 which, in turn, is a continuation-in-part of Application Ser. No. 237,810, now abandoned, filed Dec. 14, 1962.

Two step resins are soluble resinous products prepared by the reaction of less than a stoichiometric amount such as less than one mol, e.g. 0.70 to 0.85 of formaldehyde such as an aldehyde like furfural per one mole of phenol such as a mono or polyhydroxy aromatic such as hydroxy benzene compounds like polymethylene polyphenols, phenol, resorcinol, cresol, and hydrocarbon substituted hydroxy aromatic, such as alkyl substituted phenols resorcinol, etc. These resins require additional formaldehyde, paraformaldehyde, or a formaldehyde source like hexamethylenetetramine (hexamine) as methylene generating agents at the time or place of use to convert the resin to its infusible insoluble cross-linked state, e.g. sufficient additional formaldehyde to provide a stoichiometric amount or more such as a total of 1.0 to 1.3 or more mols of formaldehyde per mol of phenol.

Resorcinol-formaldehyde resins are usually prepared under alkaline conditions. These resorcinol resins cannot be dehydrated in the usual manner by distillation to a fusible stage. Thus, resorcinol resins prepared under alkaline conditions are generally in liquid form (in aqueous solution) and employ formaldehyde as the methylene source in forming the infusible, insoluble product.

A two step (resol) resin is defined herein as the water-soluble infusible product obtained by condensing a resorcinol, or a mixture of a resorcinol and a phenol with a deficiency of aldehyde in the presence of an alkaline catalyst. This product is to be distinguished from novolaks which are water insoluble and fusible, and from one step resins which, upon addition of heat alone, cross-link to a thermoset product.

Resins prepared with resorcinol are quite reactive and enable resorcinol-aldehyde resins to be cured in the room temperature range, e.g. 60 to 100° F., at intermediate temperatures of 100 to 250° F. or like other conventional resins at elevated temperatures of 250 to 350° F. or higher. The reactivity of the resin is typically proportional to the more expensive difunctional resorcinol content, and often phenol is employed to lower the cost of these low temperature curing resins without appreciably effecting reactivity. The resorcinol resins can be prepared in the presence of acid or alkaline catalyst, typically alkaline catalyst, and usually employ a greater deficiency of formaldehyde, e.g. 0.65 to 0.75 or lower mol per mol of resorcinol. The catalysts are used in amounts of from about 0.1 to 5 weight percent in preparing the first step water soluble resins, while other agents may be added to the soluble of the resin, to adjust pH to between about 4 and 9.

I have discovered that small amounts of aniline and aniline salts enhance the curing rate of resins at both low and elevated temperatures. Aniline salts in amounts of from about 0.2 to 2.0 weight percent are particularly effective as cure promoters for these resorcinol resins providing surprisingly rapid cures at very low temperatures. Low cost resorcinol-phenol resins containing as low as 20% resorcinol can be cured rapidly at room temperatures. For example, the employment of cure promoting amounts in low cost phenol-resorcinol resins provides a cure overnight at 70 to 80° F. and on an increase in cure promoter will permit the resin to be cured overnight at 20° F. while in both cases a working pot life of 3 to 4 hours can be maintained.

I have found that aniline salts can be added directly to the resin solution after preparation of the resin with the catalyst. The further addition of sufficient hexamine or other formaldehyde source such as liquid formaldehyde solution, paraformaldehyde powder, or decomposable formate compounds such as calcium formate then provides the desired infusible C stage resin.

My cure promoter permits low cost 20% resorcinol-phenol resins of the two step (or resol) type to approach or even be as fast curing as the more expensive straight 100% resorcinol resins now marketed. The primary advantage of resorcinol resins is their enhanced reactivity which permits the resins to be cured at low temperatures (60 to 100° F.) at an usual minimum working or operating temperature of about 60° F. and upper temperature limitations of about 400° F. However, with aniline salts as cure promoters, good cures can be achieved at temperatures as low as 20° F. or lower. My cure promoter accelerates the cure of two step resins in general at conventional curing temperatures. In particular, my cure promoter extends the low temperature curing range of resorcinol resins to 20° F. or lower while at higher curing temperatures my cure promoter reduces the curing time by enhancing the reactivity of the resin.

Further, I have found that the use of aniline and aniline salts as a cure promoter for resorcinol resins permit the use of lower amounts of formaldehyde to cross-link or prepare the insoluble infusible resin. For example, with conventional resorcinol resins, about 10 to 25 weight percent of formaldehyde over the stoichiometric amount in the form of paraformaldehyde, hexamine, etc. must be added at the time of use to provide a suitable cure. I have discovered that aniline or aniline salts permit a surprising and significant reduction in the quantity of aldehyde required to promote a good cure. Thus, with resorcinol resins good cures can be obtained in the presence of my cure promoters with as low as 5 weight percent of excess formaldehyde.

It is, therefore, an object of my invention to provide a method of accelerating the curing time of two step resol resins. It is also an object of my invention to provide a cure promoter which permits lower quantities of aldehyde to be used to cure resorcinol resins. A further object of my invention is to provide a cure promoter and method for lowering the cure temperature or accelerating the curing time at conventional curing temperatures of resorcinol resins. Further objects and advantages of my invention will be apparent to those skilled in the art from the detailed description of my invention and the following specific examples and embodiments thereof.

I prefer to employ aniline salts as cure promoters for my invention rather than aniline itself, because of the low cost, commercial availability, and ease of handling characteristics of the salts, and the toxicity of aniline and difficulty and precautions necessary in handling the aniline oil. The salts such as aniline hydrochloride are also preferable for use in combination with hexamine with powdered resins cured at elevated temperatures. The cure promoting action of aniline hydrochloride is so vigorous that to maintain a controllable curing cycle and pot life very small amounts of 0.1 to 1.0% or even lower can be used in a 50% resorcinol resin solution. The unexpected effects of aniline and aniline salts are not based on the acidity of the acid portion of the salt, since the use of hydrochloric acid, boric acid, or oxalic acid alone inhibits a complete cure. Thus, the function of an acidic catalyst in resole type one step resins to lower the pH and to serve as a source of acidity is not comparable to the action of aniline cure promoters, after formation of the soluble one step resin.

Suitable cure promoters of my invention include, but are not limited to: aniline, and its homologous and analogues as well as the organic or inorganic aniline salts such as aniline hydrochloride, aniline acetate, aniline oxalate, aniline phosphate, aniline sulfate, aniline borate, and the like. The aniline or aniline salts is usually employed with liquid formaldehyde or paraformaldehyde which serve as a source for the additional aldehyde needed to effect a complete cure. With two step resins, hexamine can be used as a source of formaldehyde where the curing temperature is above about 220° F., that is above the decomposition temperature of the hexamine.

The following examples are directed toward a low cost low resorcinol content phenol-resorcinol resol resin B and a high resorcinol content phenol-resorcinol resol resin A compositions in which the low temperature cure is accelerated at conventional working temperatures. The cure of these resins can be accomplished at temperatures below 60° F. by the addition of an aniline salt pure promoter.

Example I

|  | Resin "A" | Resin "B" |
|---|---|---|
| Phenol, p.b.w | 70 | 290 |
| Resorcinol, p.b.w | 300 | 88 |
| Formaldehyde, 44%, p.b.w | 97 | 262 |
| Sodium Hydroxide, p.b.w | 3.8 | 7 |
| Water, p.b.w | 3.8 | 7 |
| Denatured Ethyl Alcohol, p.b.w | 49 | 26.5 |
| Water, p.b.w | 17.5 |  |

Procedure for "A" resin

Phenol, resorcinol, formaldehyde and sodium hydroxide solution are charged into the resin kettle and brought to reflux. Reflux is maintained for 60′. The formed resin is cooled down to 40° C. Water and alcohol are added and the cooling continued to about 25° C. At this temperature the resin is completed and discharged.

Procedure for "B" resin

Phenol, formaldehyde, sodium hydroxide solution are charged, heated to reflux and held at reflux for 30′. The kettle content is then cooled to about 40° C. and resorcinol added. The material is brought again to reflux and held for additional 30′. After reflux period the resin is cooled to about 40° C., dissolved in alcohol and discharged after cooling to 25° C.

| Properties of the Resins | Resin "A" | Resin "B" |
|---|---|---|
| pH | 7.0±.2 | 7.5±.2 |
| Viscosity at 25° C., cps | 275 | 250 |
| Specific Gravity at 25° C | 1.1780 | 1.1710 |
| Water Tolerance | Infinite | 1:3 |
| Solids at 105° C./3 h., percent | 61–62 | 60–61 |

TABLE I.—CURING CHARACTERISTICS AT ROOM TEMPERATURE (21° C.) OF RESINS, "A" AND "B" UNDER INFLUENCE OF VARIOUS MODIFICATIONS

| Experiment | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|
| Resin "A" | 100 | 100 | 100 | 100 | 100 | 100 |  |  |  |  |  |  | 100 |  |  |  |
| Resin "B" |  |  |  |  |  |  | 100 | 100 | 100 | 100 | 100 | 100 |  | 100 | 100 | 100 |
| Para-formaldehyde powder | 20 | 10 | 5 | 20 | 10 | 5 | 20 | 10 | 5 | 20 | 10 | 5 | 10 | 10 | 20 | 20 |
| Aniline hydrochloride |  |  |  | 1 | 1 | 1 |  |  |  | 1 | 1 | 1 |  |  |  |  |
| Aniline oil |  |  |  |  |  |  |  |  |  |  |  |  | 1 | 1 |  |  |
| 35% hydrochloride acid |  |  |  |  |  |  |  |  |  |  |  |  |  |  | 1 |  |
| Oxalic acid |  |  |  |  |  |  |  |  |  |  |  |  |  |  |  | 1 |
| Curing Time in Minutes | 70 | 140 | 450 | 5 | 10 | 180 | 585 | 645 | (*) | 240 | 255 | 285 | 55 | 10 | (*) | (*) |

*No cure after 72 hours.

The above data demonstrates the remarkable changes in curing characteristics in resorcinol resins achieved by the use of an aniline salt cure promoter. The common fast-curing reactive high content resorcinol resin A with the addition of 5 to 20 parts of paraformaldehyde gave cure times at 21° C. of 70 to 240 minutes while the addition of only 1 part of aniline or aniline hydrochloride gave cures at the same temperature of 5, 10, and 180 minutes, a directly comparable enhancement in cure times of about 14 times the cure time with 20 and 10 parts of paraformaldehyde. Similar results were achieved with a low cost low-content resorcinol-phenol resin B (low-content being from about 20 to 40 weight per cent resorcinol) which gave cure times with aniline and aniline hydrochloride approaching or better than the expensive high-content resorcinol resin A with paraformaldehyde. The use of oxalic or hydrochloric acid alone in resin B inhibited the cure, while aniline oil alone accelerated the cure time period indicating that the acidity of the aniline salt is not the effective means of promoting cure.

Example II

I have directly compared the curing times of resorcinol-phenol resins with and without 1 percent of aniline hydrochloride with paraformaldehyde as the additional formaldehyde source at a temperature of 20° F. The resin with aniline hydrochloride set in 3 to 4 hours at the low temperature, while the resin without the aniline salt failed to set in 48 hours at this temperature.

Resorcinol-phenol resins of high resorcinol content for example from 40 to 100% resorcinol can be cured with about 2% aniline hydrochloride-paraformaldehyde combination to give good wood glue bonds in about one to two minutes at 60–80° F. This application is particularly useful in resin adhesive applications, since it permits the clamps employed to hold the material to be removed almost immediately after the fluing operation thereby releasing the equipment for further production. Resorcinol resins are typically employed in adhesive, bonding, and laminating wood applications. The resorcinol resins must be conventionally maintained at a temperature of above about 60° F. in order to obtain a cure in a reasonable time and to get a good bond. Previous to my invention, attempts to cure resorcinol resins at lower temperatures such as 40 to 50° F. gave unreasonably long curing times even with high content resorcinol resins, and permitted the resin to penetrate excessively into the wood. This action starved the bond glue line and gave little, if any, resin on the glue line surface and resulted in poor bonding strengths. My cure promoters permit conventional pot lifes of 2 to 5 houre to be maintained, yet permit a cure with high-content resorcinol resins containing, for example, 1 weight percent of aniline hydrochloride in 3 to 5 hours at 20° F., with low-content resorcinol resins in a glued assembly under clamping pressure in 5 hours to overnight (12 hours).

Rapid cures and gluing at 60–80° F. temperatures of one minute or less are possible with my system. For example the cure promoter such as aniline sulfate can be placed on one gluing surface in combination with the resin and the additional formaldehyde placed on the opposite or other gluing surface, such as by coating each surface with an appropriate solution. When the two surfaces such as wood surfaces are brought together the resin will cure immediately on contact and provide a rapid gluing method wherein only the contact time or a very short time period, 1–5 minutes is required for the resin cure. Further the surfaces can also be preprimed with a resin solution coated on one surface and a solution of paraformaldehyde or hexamine or another surface and a thin coating of aniline or aniline salts applied just before the surfaces are placed in pressurized gluing contact. Of course, as the temperature of curing increases, such as approaches 100° F. with resorcinol resins the amount of my cure promoter to promote cure can be changed.

Resorcinol resins with my cure promoter find utility as bonding, laminating, and adhesive resins such as in the preparation of wooden arches, heavy structure with thick sections, odd shaped pieces, long laminated structure and in applications where high bond strength and water resistance is important such as in the fabrication of marine plywood, boats, etc. or in other applications where articles cannot be easily handled in conventional hot platens or where low curing heats are required.

My cure promoter can be admixed with inert filler materials such as from 10 to 200 weight per cent filter based on the resin content. Suitable fiillers would include wood flour, metals, metal oxides, alumina, silicates, clays, charcoal, carbon, coke, vitreous materials, diatomaceous earths, plastics; like polyethylene, polypropylene, polyvinyl chloride, rubber, SBR; fibers like cotton, glass, nylon, asbestos; as well as pigments, dyes, plasticizers, lubricants, anti-oxidants, stabilizers, hardeners, dispersants, wetting agents, etc.

The cure promoters of my invention permit the use of a single resorcinol resin with the control of curing temperature cure time and flow obtained by varying the temperature and the amount of cure promoter. Although my cure promoters have exceptional advantages with low temperature curing results, the accelerated cure at elevated temperatures is also of importance in numerous applications.

These two-step resols can be modified with other water soluble or emulsifiable polymers of the vinyl or acrylic type or of the natural and synthetic rubber type to obtain desired properties such as flexibility and impact strength.

What is claimed is:
1. In the method of preparing an infusible, insoluble, cross-linked, thermoset resinous product obtained by a first step of reacting resorcinol with less than a stoichiometric amount of an aldehyde but with at least about 0.65 mole of aldehyde, per mole of resorcinol, in the presence of a small amount of an alkaline condensation catalyst to obtain a resol resin and the second step of reacting said resol at a curing temperature with additional aldehyde sufficient to obtain the infusible insoluble C stage product, the improvement which comprises: carrying out the second step of the reaction in the presence of a cure promoting amount of a cure promoter selected from the group consisting of aniline, aniline salts, and combinations thereof.

2. The method of claim 1 wherein the aldehyde is formaldehyde and the curing temperature is from about 20 to 350° F.

3. The cured thermoset infusible, insoluble, resinous product prepared in accordance with the method of claim 1.

4. The method of claim 1 wherein the cure promoting amount is from about 0.1 weight per cent to about 2.0 weight percent.

5. The method of claim 1 wherein the cure promoter is aniline hydrochloride.

6. The method of claim 1 wherein the resol is prepared from a mixture of phenol and a major amount of resorcinol.

7. The method of claim 6 wherein the amount of cure promoter is from about 0.1 to 2.0 weight percent of the resin.

8. The cured thermoset infusible insoluble resinous product prepared in accordance with the method of claim 6.

9. The method of claim 6 wherein the curing temperature is from about 20 to 60° F.

References Cited

UNITED STATES PATENTS

| 1,111,285 | 9/1914 | Aylsworth | 260—32.4 |
| 2,385,372 | 9/1945 | Rhodes | 260—54 |
| 2,414,414 | 1/1947 | Rhodes | 154—133 |
| 2,385,374 | 9/1945 | Rhodes | 260—30 |
| 2,478,943 | 8/1949 | Rhodes | 260—54 |
| 2,589,286 | 3/1952 | Rhodes | 260—54 |
| 2,495,175 | 1/1950 | Nagel | 154—140 |

FOREIGN PATENTS

| 3,498 | 2/1912 | Great Britain. |

OTHER REFERENCES

Carswell, Phenoplasts, N.Y., 1947, pp. 51–54.
De Bruyne, Adhesion and Adhesives, N.Y., 1951 pp. 205–206, 214–215, 222–225.

WILLIAM H. SHORT, Primary Examiner

H. SCHAIN, Assistant Examiner

U.S. Cl. X.R.

156—310, 335; 161—262; 260—33.4, 38, 17.2, 3, 29.3, 28, 847